Patented Feb. 21, 1933

1,898,075

UNITED STATES PATENT OFFICE

HENRI BARBIER, OF GENEVA, SWITZERLAND, ASSIGNOR TO GIVAUDAN-DELAWANNA, INC., OF NEW YORK, N. Y., A CORPORATION OF NEW YORK

ALLYL CITRYLIDENE ACETONE AND PREPARATION OF SAME

No Drawing.    Application filed September 18, 1930.   Serial No. 482,906.

This invention relates to new compounds for use in perfumes and more particularly to the condensation products of citral and allyl acetone in the presence of alkaline condensation agents.

Heretofore, compounds known as ionones have been obtained by condensing citral with acetone and subjecting the resulting product to an acid agent. The object of the present invention is to provide new compounds of this general type, having a new and distinctive odor, and a process of obtaining same.

According to the present invention citral is treated with allyl acetone in the presence of an alkaline condensing agent to form allyl citrylidene acetone, a straight chain compound having the following formula $C(CH_3)_2:CH \cdot CH_2 \cdot CH_2 \cdot C(CH_3):CH \cdot CH \cdot CO \cdot CH_2 \cdot C_3H_5$ This heretofore unknown compound is a liquid having a boiling point between 140 to 150° C. at 3 mm. pressure, has a specific gravity of 0.9070, is insoluble in water, and soluble in most of the usual organic solvents.

The allyl citrylidene acetone is then treated with an acid agent to form the ring isomer thereof, allyl cyclo citrylidene acetone, a mixture of the formulæ:

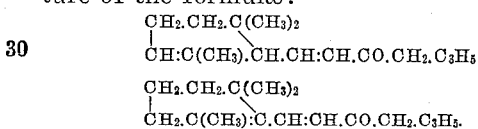

This ring compound possesses a very distinctive odor totally different from all the known homologues of ionone and is extremely desirable for obtaining new effects in perfumes.

The reaction may be represented as follows:

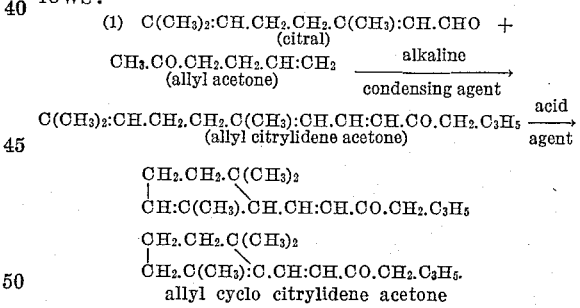

allyl cyclo citrylidene acetone

The ring isomer is a yellowish liquid, boiling at 130° at 3 mm. pressure and having a specific gravity at 15° C. of 0.9367. It possesses a pleasant, powerful, and tenacious odor and is particularly adapted for use in perfumes and soap. It is insoluble in water and soluble in most organic solvents.

*Example I.*—12 kilos of citral and 7 kilos of allyl acetone are agitated with 680 gms. of sodium alcoholate for about an hour at room temperature. The mixture is neutralized and the layer of unreacted allyl acetone and citral separated. The remainder of the mixture is then distilled at 140 to 170° C. and 10 mm. pressure. Allyl citrylidene acetone is thus obtained. This compound is then mixed with three times its weight of 50° Bé. sulphuric acid and the mixture stirred for about one hour at about 40° C. The mixture is then run on ice, washed with water and vacuum distilled. The allyl cyclo citrylidene acetone distils over as a clear yellow liquid boiling at 130° C. at 3 mm.

The proportions of reactants as given above are merely illustrative and may be varied considerably. In place of sodium alcoholate the following alkaline condensing agents may be used: caustic soda, sodium amid.

Instead of sulphuric acid, other acid agents as phosphoric acid, arsenic acid, may be used.

Although the proportion of allyl acetone to citral may be varied widely, it is preferred to use six parts by weight of allyl acetone to one to two parts by weight of citral.

Instead of citral with allyl acetone to form allyl citrylidene acetone and then treating this compound with an acid to form the ring isomer thereof, cyclo citral, the ring isomer of the straight chain citral, can be used with allyl acetone to form allyl cyclo citrylidene acetone directly.

*Example II.*—1000 parts by weight of cyclo citral are mixed with 2000 parts by weight of allyl acetone and a solution of 20 parts by weight of sodium dissolved in 200 parts by weight of methyl alcohol are added to the mixture with stirring. The reaction liquid is allowed to stand for two hours, neutralized, and the excess allyl acetone removed by steam distillation. The remaining liquor is washed until neutral and distilled in vacuum. Allyl cyclo citrylidene acetone comes over at about 130° C. at 3 mm. pressure.

In this reaction it is preferred to use six parts by weight of allyl acetone to one to two parts by weight of cyclo citral.

The invention claimed is:

1. As a new compound, allyl cyclo citrylidene acetone.

2. Process comprising condensing citral and allyl acetone in the presence of an alkaline condensing agent.

3. Process comprising condensing citral and allyl acetone in the presence of sodium alcoholate.

4. Process comprising condensing citral and allyl acetone in the presence of an alkaline condensing agent and treating the condensation product with an acid agent.

5. Process comprising condensing citral and allyl acetone in the presence of sodium alcoholate and treating the condensation product with sulphuric acid.

6. Process comprising condensing cyclo citral and allyl acetone in the presence of an alkaline condensing agent.

7. Process comprising condensing cyclo citral and allyl acetone in the presence of sodium alcoholate.

8. Process comprising condensing cyclo citral and an excess of allyl acetone in the presence of an alkaline condensing agent, allowing said mixture to stand until the condensation is substantially completed, removing the excess allyl acetone by steam distillation and distilling the remaining liquor under a vacuum and collecting the fraction coming over at about 130° C. at 3 mm. pressure.

Signed at Geneva, Switzerland, this fourth day of September A. D. 1930.

HENRI BARBIER.